(12) United States Patent
Ogawa

(10) Patent No.: US 11,165,919 B2
(45) Date of Patent: Nov. 2, 2021

(54) IMAGE FORMING APPARATUS WITH SOUND OUTPUT CONTROL, AND IMAGE FORMING SYSTEM INCLUDING THE SAME

(71) Applicant: KYOCERA Document Solutions Inc., Osaka (JP)

(72) Inventor: Tomohiro Ogawa, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/105,688

(22) Filed: Nov. 27, 2020

(65) Prior Publication Data

US 2021/0160386 A1 May 27, 2021

(30) Foreign Application Priority Data

Nov. 27, 2019 (JP) .............................. JP2019-214305

(51) Int. Cl.
*H04N 1/00* (2006.01)
(52) U.S. Cl.
CPC ....... *H04N 1/00488* (2013.01); *H04N 1/0049* (2013.01); *H04N 1/00472* (2013.01)
(58) Field of Classification Search
CPC ........... H04N 1/00488; H04N 1/00472; H04N 1/0049; H04N 1/00408
See application file for complete search history.

(56) References Cited

U.S. PATENT DOCUMENTS

2008/0018957 A1* 1/2008 Suzuki ............... H04N 1/00222
358/474
2014/0293339 A1* 10/2014 Satou ................. H04N 1/00281
358/1.15

FOREIGN PATENT DOCUMENTS

JP      2013-090115      5/2013

* cited by examiner

*Primary Examiner* — Iriana Cruz
(74) *Attorney, Agent, or Firm* — Lex IP Meister, PLLC

(57) ABSTRACT

An image forming apparatus includes a communication section, an operation section, a sound generating section, and a control section. The communication section is communicably connected to an external terminal. The operation section is operated by the external terminal. The sound generating section generates sound when the operation section is operated. The control section controls the sound generating section. The operation section has an operation accepting section that accepts an operation by an operator. The control section determines whether the operation section is operated by the external terminal or operated by the operator when the operation section is operated. When determining that the operation section is operated by the external terminal, the control section prohibits generation of sound by the sound generating section. When determining that the operation section is operated by the operator, the control section permits the generation of the sound by the sound generating section.

6 Claims, 12 Drawing Sheets

IMAGE FORMING APPARATUS WITH SOUND OUTPUT CONTROL, AND IMAGE FORMING SYSTEM INCLUDING THE SAME

INCORPORATION BY REFERENCE

This application is based upon, and claims the benefit of priority from, corresponding Japanese Patent Application No. 2019-214305 filed in the Japan Patent Office on Nov. 27, 2019, the entire contents of which are incorporated herein by reference.

BACKGROUND

Field of the Invention

The present disclosure relates to an image forming apparatus and an image forming system.

Description of Related Art

An image forming apparatus capable of performing maintenance and changing settings from an external terminal has been known. More specifically, in such an image forming apparatus, an operation panel of the image forming apparatus is operated from the external terminal. An example of the maintenance is improvement of a printed image by drum refreshing. An example of the setting change is addition and a change of a registered user. When the operation panel of the image forming apparatus is operated from the external terminal, similar to a time when the user operates the operation panel, operation sound is output.

SUMMARY

An image forming apparatus according to the present disclosure includes a communication section, an operation section, a sound generating section, and a control section. The communication section is communicably connected to an external terminal. The operation section is operated by the external terminal. The sound generating section generates sound when the operation section is operated. The control section controls the sound generating section. The operation section has an operation accepting section that accepts an operation by an operator. The control section determines whether the operation section is operated by the external terminal or operated by the operator when the operation section is operated. When determining that the operation section is operated by the external terminal, the control section prohibits generation of sound by the sound generating section. When determining that the operation section is operated by the operator, the control section permits the generation of the sound by the sound generating section.

An image forming system according to the present disclosure includes the image forming apparatus and an external terminal. The external terminal is communicably connected to the image forming apparatus and operates an operation section of the image forming apparatus.

DETAILED DESCRIPTION

Figure 1:
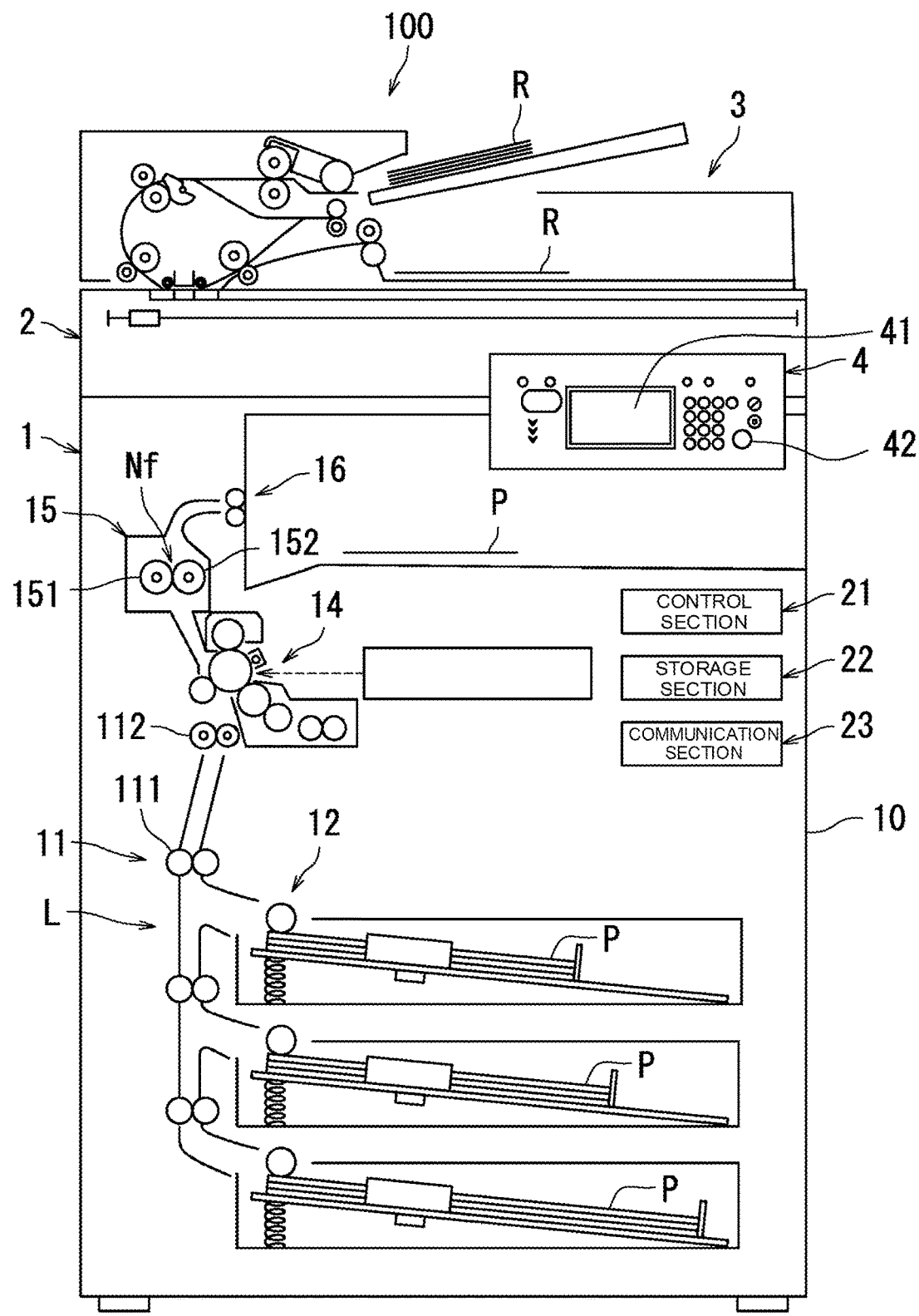
FIG. 1 is a view illustrating an image forming apparatus according to a first embodiment of the present disclosure.

A description will hereinafter be made on each embodiment of the present disclosure with reference to the drawings. In the drawings, the same or corresponding portions will be denoted by the same reference numerals, and a description thereon will not be repeated.

First Embodiment

A description will be made on a configuration and operation of an image forming apparatus 100 with reference to FIG. 1. FIG. 1 is a view illustrating the image forming apparatus 100 according to a first embodiment of the present disclosure. In this embodiment, the image forming apparatus 100 is a monochrome multifunction peripheral.

As illustrated in FIG. 1, the image forming apparatus 100 includes an image forming unit 1, an image reading unit 2, a document transporting unit 3, an operation section 4, a control section 21, a storage section 22, and a communication section 23. The image forming unit 1 forms an image on a sheet P. The image reading unit 2 reads the image formed on a document R and generates image data of the image. The document transporting unit 3 transports the document R to the image reading unit 2.

Hereinafter, a description will be made on the specific configuration of the image forming apparatus 100.

The operation section 4 accepts an operation from a user. The operation section 4 includes a touch display 41 and an operation key 42. The touch display 41 includes a display device and a touch sensor. The display device shows various images. For example, the display device is a liquid-crystal display (LCD). The touch sensor accepts the operation from the user. The operation key 42 accepts the operation from the user. An example of the operation from the user is an operation to instruct execution of a print job. The touch sensor and the operation key 42 are examples of the operation accepting section.

The image forming unit 1 includes a feeding section 12, a transport mechanism 11, an image forming section 14, a fixing section 15, and a discharge section 16. The image forming unit 1 has a transport path L. In addition, the image forming apparatus 100 has a casing 10. The casing 10 accommodates the feeding section 12, the transport mechanism 11, the image forming section 14, the fixing section 15, and the discharge section 16. The casing 10 further accommodates the transport path L.

The feeding section 12 supplies the sheet P to the transport path L. For example, the sheet P is plain paper, copy paper, recycled paper, thin paper, thick paper, glossy paper, or overhead projector paper (OHP). The sheet P corresponds to an example of the "recording medium".

The transport path L guides the sheet P from the feeding section 12 to the discharge section 16. The transport path L extends from the feeding section 12 to the discharge section 16.

The transport mechanism 11 transports the sheet P. More specifically, the transport mechanism 11 transports the sheet P to the discharge section 16 through the image forming section 14 and the fixing section 15.

The transport mechanism 11 includes a transport roller 111 and a resist roller 112.

The transport roller 111 transports the sheet P, which is fed out of the feeding section 12, to the resist roller 112. The transport roller 111 is arranged in the transport path L.

The resist roller 112 adjusts timing of transporting the sheet P to the image forming section 14. The resist roller 112 transports the sheet P to the image forming section 14. The resist roller 112 is arranged in the transport path L. The resist roller 112 is arranged on an upstream side of the image forming section 14 in a transport direction of the sheet P.

The image forming section 14 forms the image on the sheet P. More specifically, the image forming section 14 forms a toner image on the sheet P by an electrophotographic method. In other words, the image forming section 14 forms the image on the sheet P by using a toner. The image forming section 14 includes a transfer section, an image carrier, a charging section, an exposure section, a developing section, and a static elimination section. A specific configuration of the image forming section 14 is an existing configuration. Thus, a description thereon will not be made.

The fixing section 15 heats the sheet P and fixes the image onto the sheet P. More specifically, the fixing section 15 heats and pressurizes the sheet P, and fixes the image, which is formed on the sheet P, onto the sheet P. The fixing section 15 includes a heating roller 151 and a pressurizing roller 152. The heating roller 151 has a cylindrical shape having a rotation axis, and rotates about the rotation axis. The fixing section 15 further includes is a heater. The heating roller 151 is heated by the heater.

The heating roller 151 is pressed by the pressurizing roller 152, and a nip section Nf is formed between the heating roller 151 and the pressurizing roller 152. The sheet P passes through the nip section Nf between the heating roller 151 and the pressurizing roller 152. When the sheet P passes through the nip section Nf, the heating roller 151 comes into contact with a surface of the sheet P, and fixes the toner image onto the sheet P. Of both surfaces of the sheet P, the above surface is formed with the toner image.

The discharge section 16 discharges the sheet P to the outside of the image forming apparatus 100 (outside of the casing 10). After the fixing section 15 fixes the toner image onto the sheet P, the transport mechanism 11 transports the sheet P from the fixing section 15 to the discharge section 16. Then, the discharge section 16 discharges the sheet P, onto which the toner image is fixed, to the outside of the image forming apparatus 100.

The control section 21 controls the operation of the image forming apparatus 100. The control section 21 includes a processor such as a central processing unit (CPU).

The storage section 22 includes a storage device, and stores data and a computer program. More specifically, the storage section 22 includes a main storage device such as semiconductor memory and an auxiliary storage device such as semiconductor memory and/or a hard disk drive. The storage section 22 may include a removable media. The processor in the control section 21 runs the computer program stored in the storage device of the storage section 22 so as to control the transport mechanism 11, the feeding section 12, the image forming section 14, the fixing section 15, the discharge section 16, the image reading unit 2, the document transporting unit 3, and the operation section 4.

Figure 2:
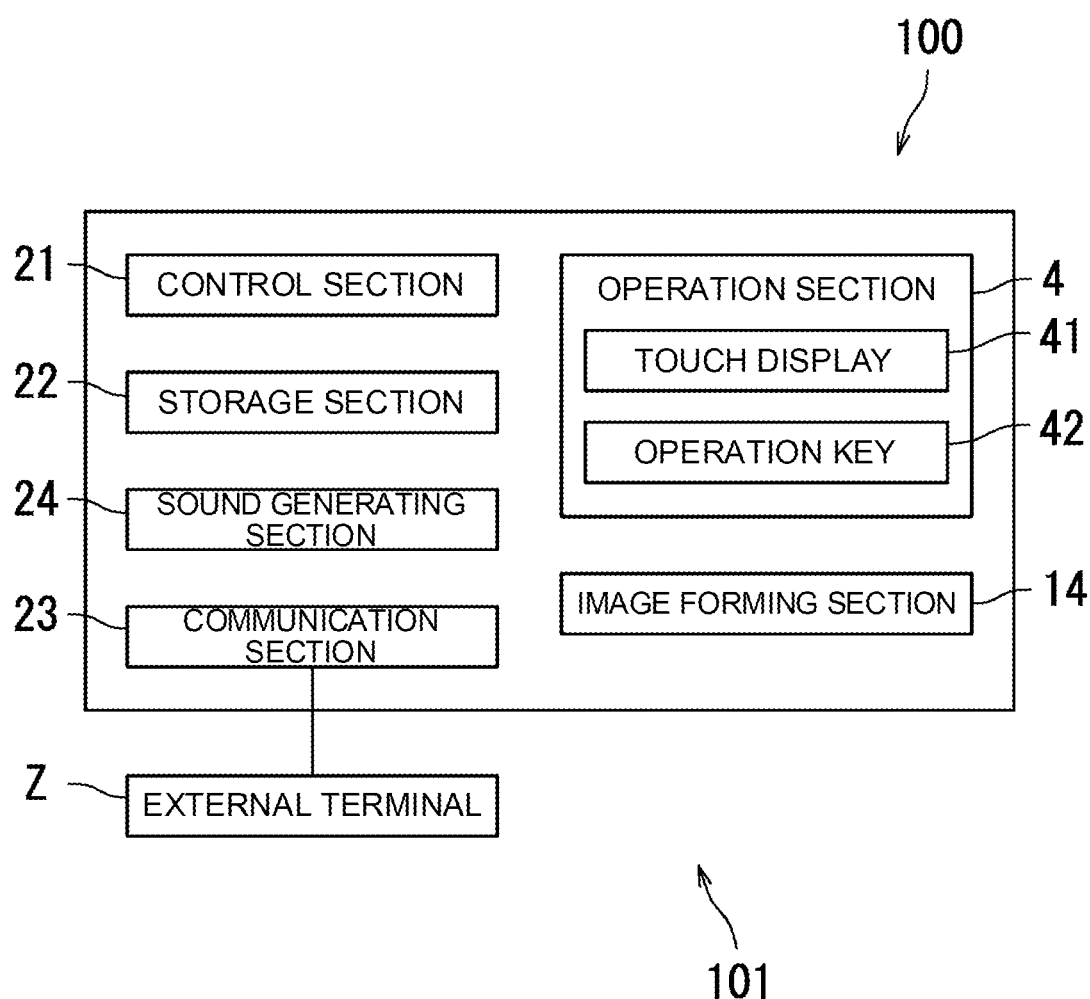
FIG. 2 is a block diagram illustrating the image forming system according to the first embodiment of the present disclosure.

Next, a description will be made on the image forming apparatus 100 and an image forming system 101 with reference to FIG. 1 and FIG. 2. FIG. 2 is a block diagram illustrating the image forming system 101. As illustrated in FIG. 2, the image forming system 101 includes the image forming apparatus 100 and an external terminal Z. The communication section 23 is communicably connected to the external terminal Z.

In this embodiment, the communication section 23 is communicably connected to the external terminal Z via an intranet in the same building.

The external terminal Z maintains and manages the image forming apparatus 100. The external terminal Z is an information processor such as a personal computer. In detail, the external terminal Z governs the maintenance and a setting change of the image forming apparatus 100. More specifically, the external terminal Z remotely operates the operation section 4 to maintain and change the settings of the image forming apparatus 100. The maintenance of the image forming apparatus 100 includes improvement of the printed image (the toner image formed on the sheet P) by drum refresh, and the like. The setting changes of the image forming apparatus 100 include addition of a registered user, addition of a contact, and the like. The communication section 23 and the external terminal Z may communicably be connected to each other via the Internet or a dedicated line. Hereinafter, a case where the external terminal Z is connected to the image forming apparatus 100 (the communication section 23) in a manner capable of remotely operating the operation section 4 may be described as "remote connection".

As illustrated in FIG. 2, the image forming apparatus 100 further includes a sound generating section 24 that generates sound when the operation section 4 is operated. The control section 21 causes the sound generating section 24 to generate specific sound when the touch display 41 or the operation key 42 is directly operated by the user. An example of the specific sound generated by the sound generating section 24 is confirmation sound for the user to confirm that the operation section 4 is being operated.

In this embodiment, when the operation section 4 is operated, the control section 21 determines whether the operation section 4 is operated by the external terminal Z or an operator. In the case where the control section 21 determines that the operation section 4 is operated by the external terminal Z, the control section 21 prohibits generation of the sound by the sound generating section 24. On the other hand, in the case where the control section 21 determines that the operation section 4 is operated by the user (the operator), the control section 21 permits the generation of the sound by the sound generating section 24. In this way, it is possible to suppress unnecessary sound from being generated as a result of the operation of the operation section 4 by the external terminal Z. As a result, it is possible to suppress a worker who performs a job in the vicinity of the image forming apparatus 100 from being interfered.

Figure 3:
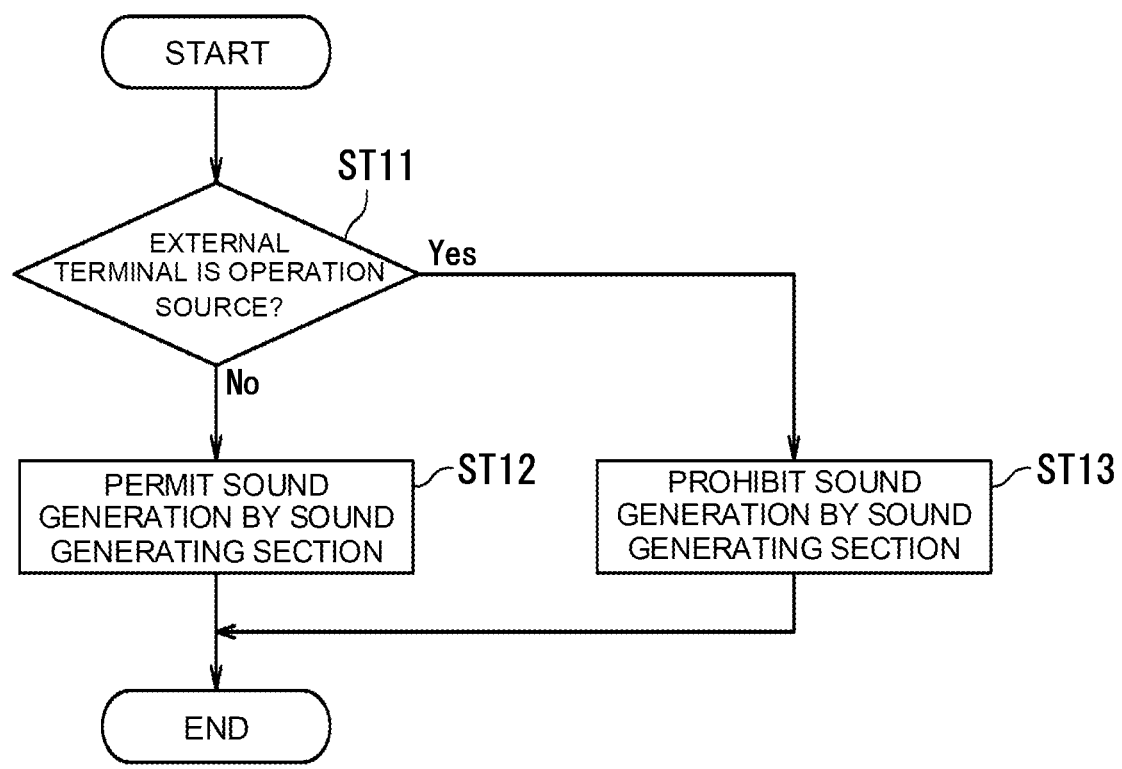
FIG. 3 is a flowchart illustrating processing that is executed by a control section according to the first embodiment of the present disclosure.

Next, a description will be made on processing that is executed by the control section 21 of the image forming apparatus 100 with reference to FIG. 3. FIG. 3 is a flowchart illustrating the processing that is executed by the control section 21 according to this embodiment. The processing in FIG. 3 includes steps ST11 to ST13. The processing in FIG. 3 is initiated when the operation section 4 is operated.

In step ST11, the control section 21 determines whether an operation source that operates the operation section 4 is the external terminal Z. If the control section 21 determines that the operation source is the external terminal Z (Yes in step ST11), the processing proceeds to step ST13. On the other hand, if the control section 21 determines that the operation source is not the external terminal Z, more specifically, if the operation section 4 is directly operated by the user (No in step ST11), the processing proceeds to step ST12.

In step ST12, the control section 21 permits the generation of the sound by the sound generating section 24. As a result, the processing in FIG. 3 is terminated.

In step ST13, the control section 21 prohibits the generation of the sound by the sound generating section 24. As a result, the processing in FIG. 3 is terminated.

Second Embodiment

Next, a description will be made on a second embodiment of the present disclosure with reference to FIG. 4 to FIG. 6. In the second embodiment, processing executed by the control section 21 differs from that in the first embodiment. In the second to fourth embodiments, which will be described below, components corresponding to the components described in the first embodiment will be denoted by the same reference numerals, and the specific description thereon will not be made.

Figure 4:
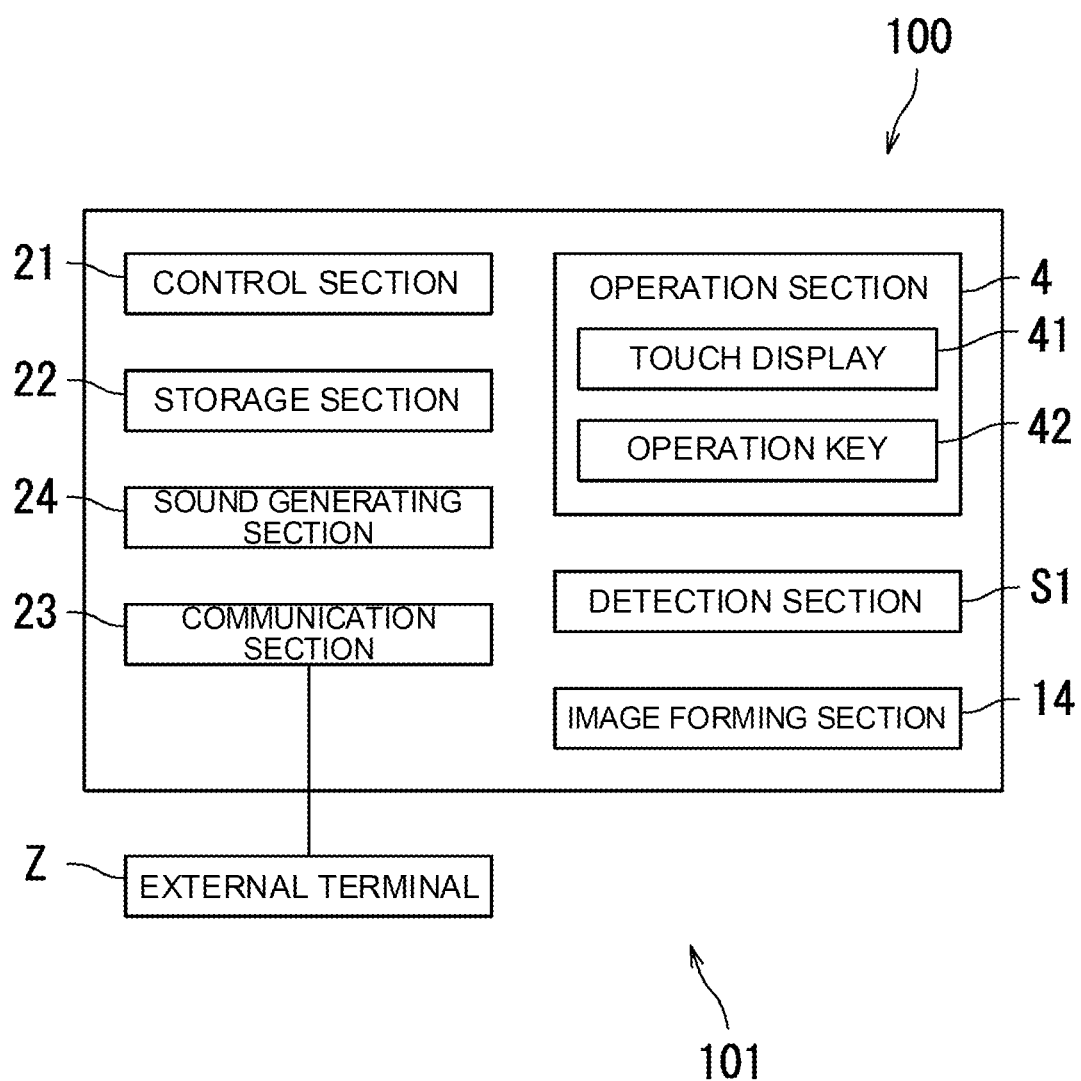
FIG. 4 is a block diagram illustrating an image forming system according to a second embodiment of the present disclosure.

FIG. 4 is a block diagram illustrating the image forming system 101 according to this embodiment. As illustrated in FIG. 4, the image forming apparatus 100 further includes a detection section S1. The detection section S1 detects a detection target. More specifically, the detection section S1 detects a person who exists in a detection range. For example, the detection section S1 is a human detecting sensor.

Figure 5:
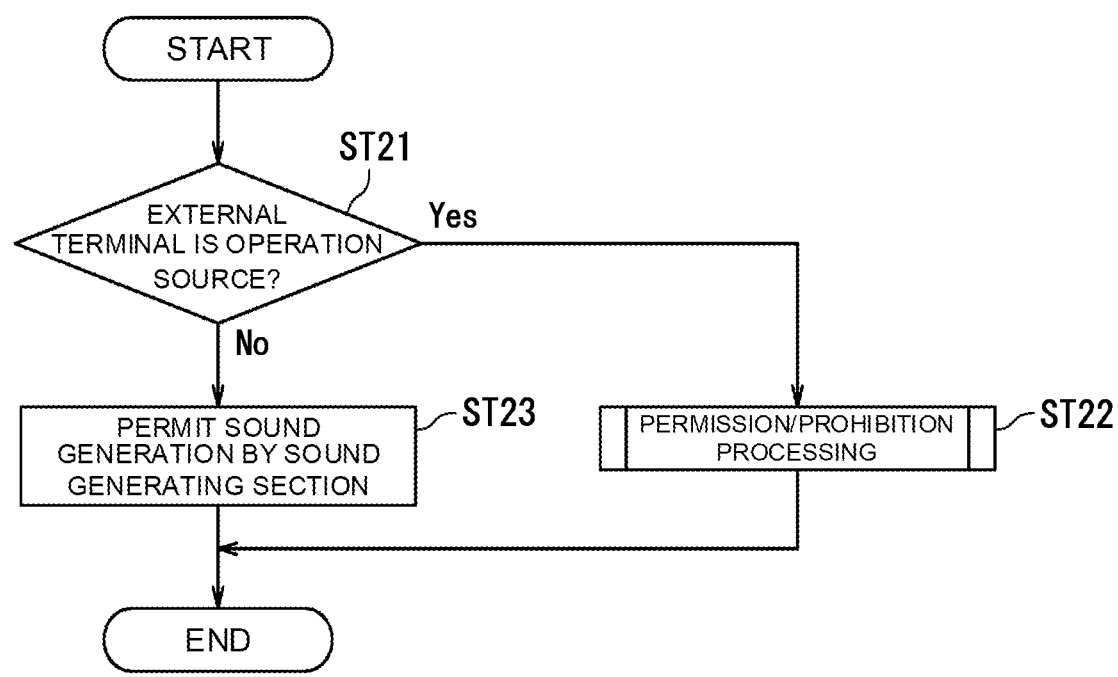
FIG. 5 is a flowchart illustrating processing that is executed by a control section according to the second embodiment of the present disclosure.

FIG. 5 is a flowchart illustrating processing that is executed by the control section 21 according to this embodiment. In detail, FIG. 5 illustrates processing in which the control section 21 permits the generation of the sound by the sound generating section 24 even when the operation source is the external terminal Z. The processing illustrated in FIG. 5 includes steps ST21 to ST23.

In step ST21, the control section 21 determines whether the operation source is the external terminal Z. If the control section 21 determines that the operation source is the external terminal Z (Yes in step ST21), the processing proceeds to step ST22. On the other hand, if the control section 21 determines that the operation source is not the external terminal Z, more specifically, if the operation section 4 is directly operated by the user (No in step ST21), the processing proceeds to step ST23.

In step ST22, the control section 21 executes the prohibition/permission processing. As a result, the processing in FIG. 5 is terminated.

In step ST23, the control section 21 permits the generation of the sound by the sound generating section 24. As a result, the processing in FIG. 5 is terminated.

Next, a description will be made on the prohibition/permission processing (step ST22 in FIG. 5) with reference to FIG. 6. FIG. 6 is a flowchart illustrating the prohibition/permission processing according to the second embodiment of the present disclosure. As illustrated in FIG. 6, the prohibition/permission processing according to this embodiment includes steps ST31 to ST36.

In step ST31, the control section 21 prohibits the generation of the sound by the sound generating section 24. Then, the processing proceeds to step ST32.

In step ST32, the control section 21 determines whether the detection section S1 has detected the detection target. If the control section 21 determines that the detection section S1 has detected the detection target (Yes in step ST32), the processing proceeds to step ST33. On the other hand, if the control section 21 determines that the detection section S1 has not detected the detection target (No in step ST32), the processing proceeds to step ST34.

In step ST33, the control section 21 permits the generation of the sound by the sound generating section 24. Then, the processing proceeds to step ST35.

In step ST34, the control section 21 determines whether the remote connection has been canceled. If the control section 21 determines that the remote connection has been canceled (Yes in step ST34), the prohibition/permission processing is terminated. On the other hand, if the control section 21 determines that the remote connection has not been canceled (No in step ST34), the processing proceeds to step ST32.

In step ST35, the control section 21 determines whether the remote connection has been canceled. If the control section 21 determines that the remote connection has been canceled (Yes in step ST35), the prohibition/permission processing is terminated. On the other hand, if the control section 21 determines that the remote connection has not been canceled (No in step ST35), the processing proceeds to step ST36.

In step ST36, the control section 21 determines whether the detection section S1 currently detects the detection target. If the control section 21 determines that the detection section S1 currently detects the detection target (Yes in step ST36), the processing proceeds to step ST35. On the other hand, if the control section 21 determines that the detection section S1 does not currently detect the detection target (No in step ST36), more specifically, if the detection target moves out of the detection range of the detection section S1, the processing proceeds to step ST31. More specifically, the detection range includes a range near the image forming apparatus 100.

Figure 6:
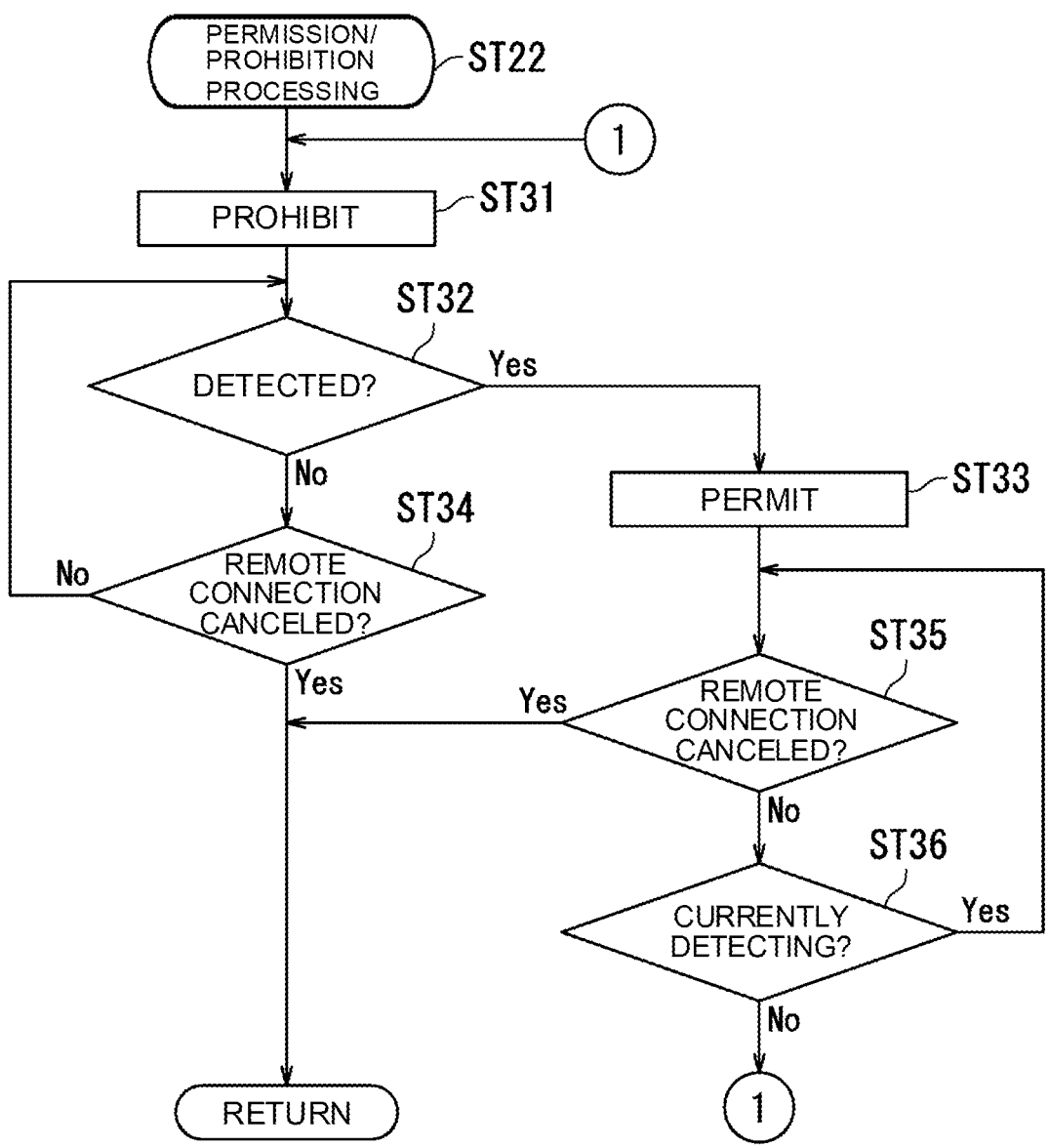
FIG. 6 is a flowchart illustrating prohibition/permission processing according to the second embodiment of the present disclosure.

The second embodiment has been described so far with reference to FIG. 4 to FIG. 6. According to the second embodiment, it is possible to generate the sound only when being needed by the user without generating the unnecessary sound.

Third Embodiment

Figure 7:
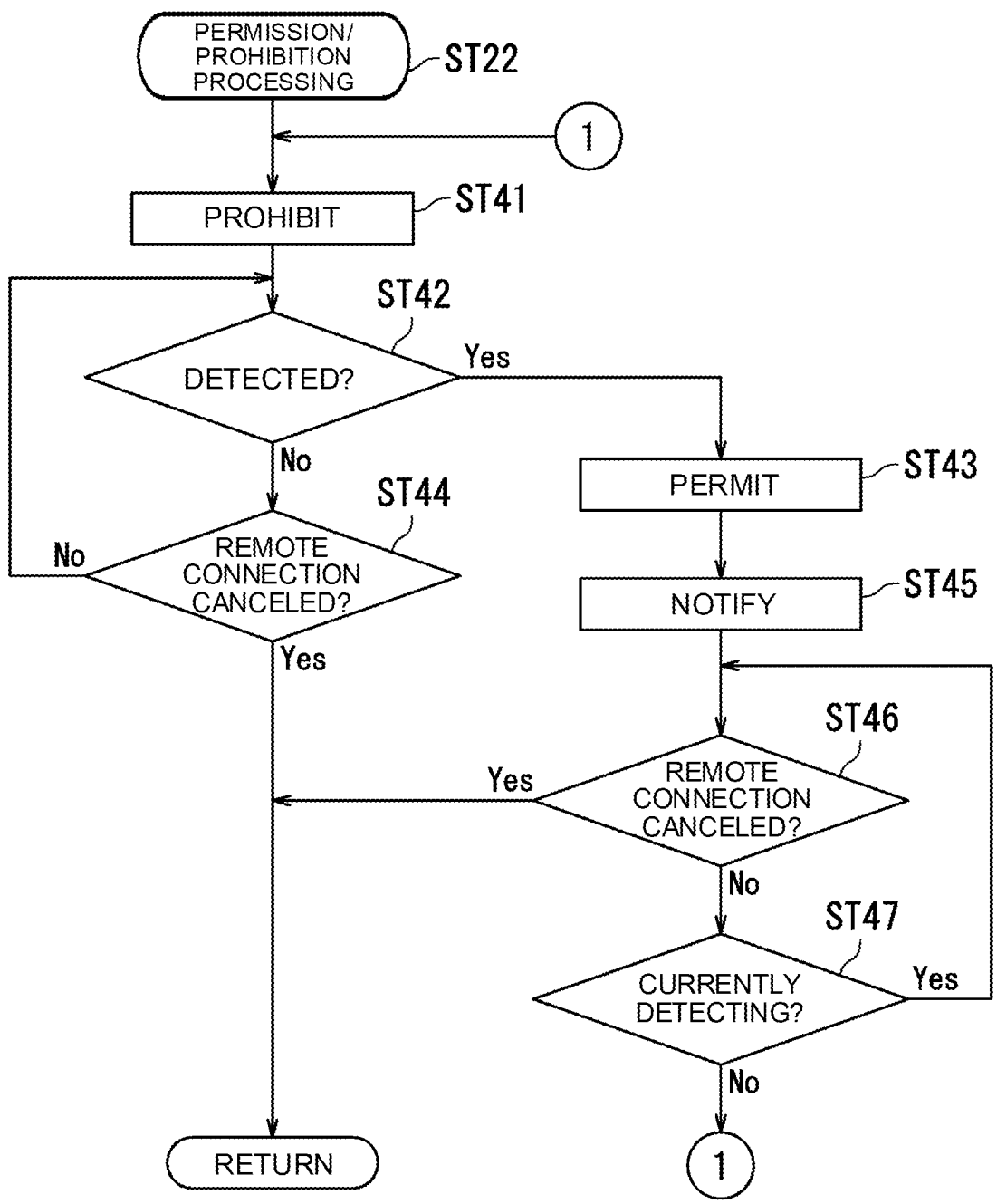
FIG. 7 is a flowchart illustrating prohibition/permission processing according to a third embodiment of the present disclosure.
Figure 8:
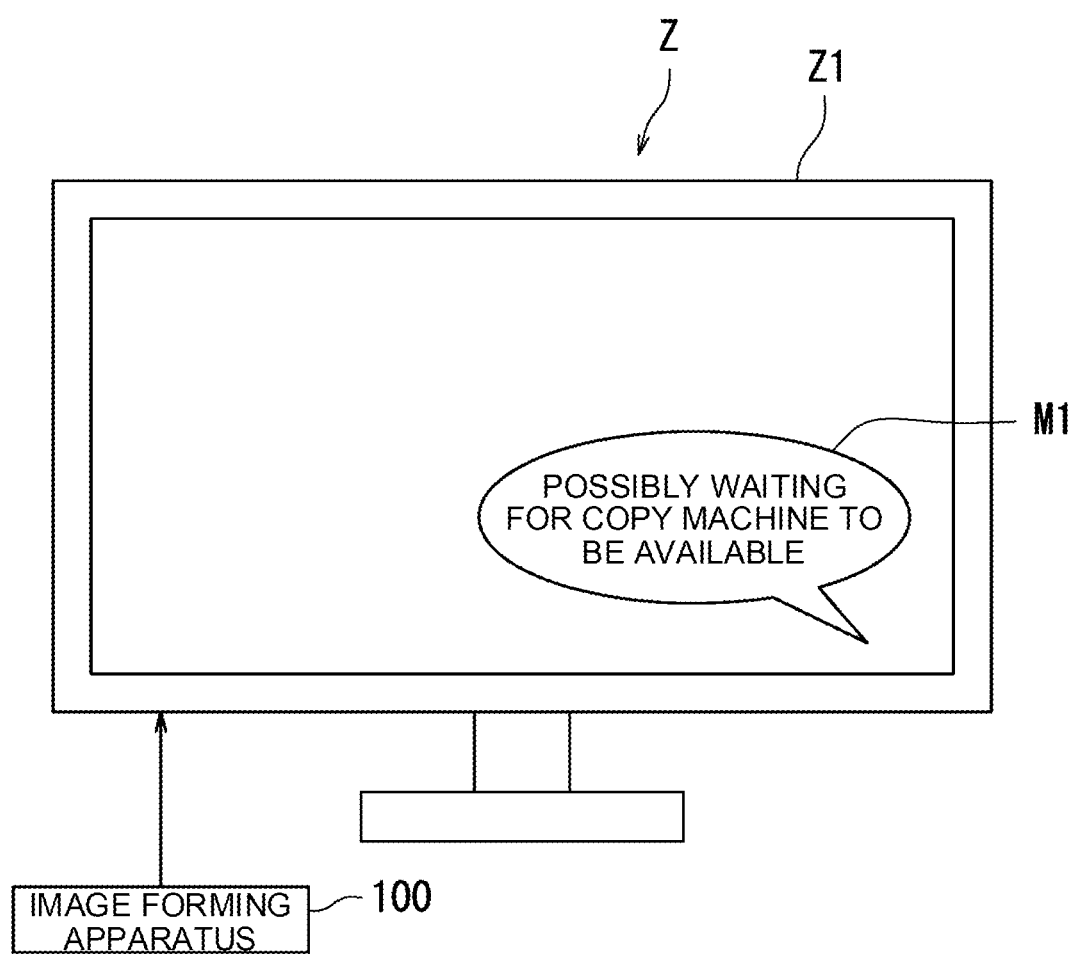
FIG. 8 is a view illustrating an example of a message that appears on a display provided in an external terminal according to the third embodiment of the present disclosure.

Next, a description will be made on processing that is executed by the control section 21 of the image forming apparatus 100 according to a third embodiment of the present disclosure with reference to FIG. 4, FIG. 5, FIG. 7, and FIG. 8. In the third embodiment, the processing executed by the control section 21 differs from that in the first embodiment and the second embodiment. FIG. 7 is a flowchart illustrating prohibition/permission processing according to the third embodiment of the present disclosure. FIG. 8 is a view illustrating an example of a message M1 shown in a display Z1 provided in the external terminal Z. The control section 21 of the image forming apparatus 100 according to the third embodiment executes the processing, which is illustrated in FIG. 5 and described in the second embodiment.

In this embodiment, the prohibition/permission processing illustrated in FIG. 7 (step ST22 in FIG. 5) includes step ST41 to step ST47.

In step ST41, the control section 21 prohibits the generation of the sound by the sound generating section 24. Then, the processing proceeds to step ST42.

In step ST42, the control section 21 determines whether the detection section S1 has detected the detection target. If the control section 21 determines that the detection section S1 has detected the detection target (Yes in step ST42), the processing proceeds to step ST43. On the other hand, if the control section 21 determines that the detection section S1 has not detected the detection target (No in step ST42), the processing proceeds to step ST44.

In step ST43, the control section 21 permits the generation of the sound by the sound generating section 24. Then, the processing proceeds to step ST45.

In step ST44, the control section 21 determines whether the remote connection has been canceled. If the control section 21 determines that the remote connection has been canceled (Yes in step ST44), the prohibition/permission processing is terminated. On the other hand, if the control section 21 determines that the remote connection has not been canceled (No in step ST44), the processing proceeds to step ST42.

In step ST45, the control section 21 transmits information indicating that the detection section S1 has detected the detection target to the external terminal Z via the communication section 23. In this embodiment, the control section 21 transmits the message M1, which will be described with reference to FIG. 8, to the external terminal Z. As a result, the message M1 appears on the display Z1 of the external terminal Z. Then, the processing proceeds to step ST46.

In step ST46, the control section 21 determines whether the remote connection has been canceled. If the control section 21 determines that the remote connection has been canceled (Yes in step ST46), the prohibition/permission processing is terminated. On the other hand, if the control section 21 determines that the remote connection has not been canceled (No in step ST46), the processing proceeds to step ST47.

In step ST47, the control section 21 determines whether the detection section S1 currently detects the detection target. If the control section 21 determines that the detection section S1 currently detects the detection target (Yes in step ST47), the processing proceeds to step ST46. On the other hand, if the control section 21 determines that the detection section S1 does not currently detect the detection target (No in step ST47), the processing proceeds to step ST41.

Next, a description will be made on the message M1 of which the image forming apparatus 100 notifies the external terminal Z with reference to FIG. 8. As illustrated in FIG. 8, for example, the message M1 "POSSIBLY WAITING FOR COPY MACHINE TO BE AVAILABLE" appears on the display Z1 of the external terminal Z. In this way, the operator of the external terminal Z can check a situation where the user is about to use the image forming apparatus 100.

The third embodiment has been described so far with reference to FIG. 4, FIG. 5, FIG. 7, and FIG. 8. In this embodiment, in the case where the detection section S1 detects the detection target while the operation section 4 is operated by the external terminal Z, the control section 21 transmits the information indicating that the detection section S1 has detected the detection target to the external terminal Z via the communication section 23. In this way, the operator of the external terminal Z can understand that it is currently in the situation where the user is about to use the image forming apparatus 100. As a result, the operator of the external terminal Z can promptly realize the situation where the user can use the image forming apparatus 100 by promptly finishing or interrupting the work.

Fourth Embodiment

Next, a description will be made on a fourth embodiment of the present disclosure with reference to FIG. 1, FIG. 5, and FIG. 9 to FIG. 12. Processing that is executed by the control section 21 in the fourth embodiment differs from that in the first embodiment, the second embodiment, and the third embodiment.

Figure 9:
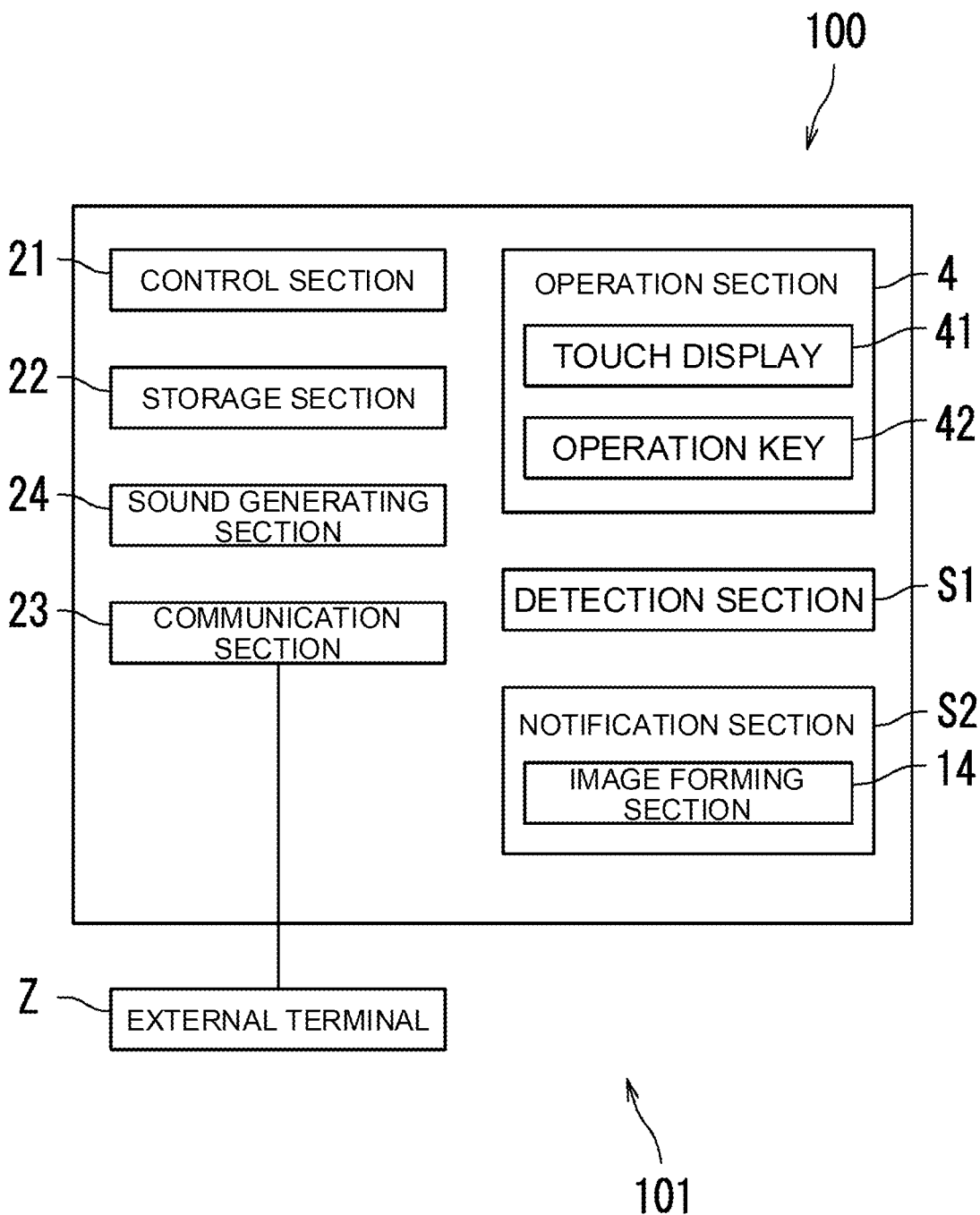
FIG. 9 is a block diagram illustrating an image forming system according to a fourth embodiment of the present disclosure.

FIG. 9 is a block diagram illustrating the image forming system 101 according to this embodiment. As illustrated in FIG. 9, the image forming section 14 functions as a part of a notification section S2 in this embodiment. The notification section S2 notifies the user of the image forming apparatus 100 that the operation of the operation section 4 by the external terminal Z is finished.

The control section 21 causes the image forming section 14 to function as the part of the notification section S2. The notification section S2 notifies that the operation of the operation section 4 by the external terminal Z is finished. In detail, the control section 21 controls the notification section S2 such that the notification section S2 notifies that the operation of the operation section 4 by the external terminal Z is finished when the operation by the external terminal Z is finished while the detection section S1 detects the detection target. In this way, the user can promptly know that the image forming apparatus 100 becomes available. As a result, it is possible to save a time that is wasted by the user who waits for the image forming apparatus 100 to become available.

In this embodiment, the control section 21 controls the image forming section 14 in a manner to form a message image, which indicates that the operation of the operation section 4 by the external terminal Z is finished, on the sheet P when the operation by the external terminal Z is finished while the detection section S1 detects the detection target. The control section 21 controls the discharge section 16 to discharge the sheet P, on which the message image has been formed, to the outside of the casing 10. In this way, it is possible to notify the user that the image forming apparatus 100 becomes available without generating the unnecessary sound.

Figure 10:
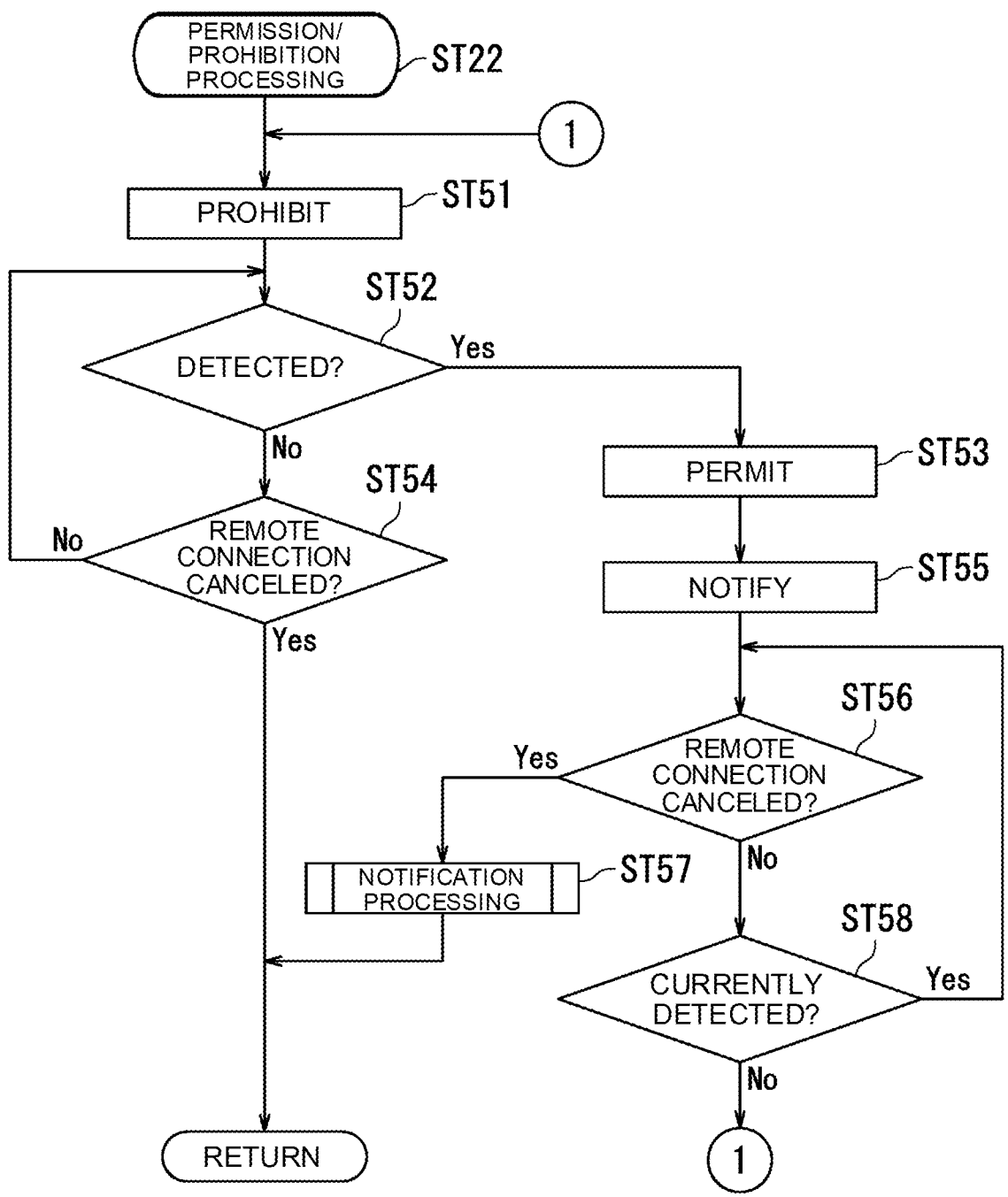
FIG. 10 is a flowchart illustrating prohibition/permission processing according to the fourth embodiment of the present disclosure.
Figure 11:
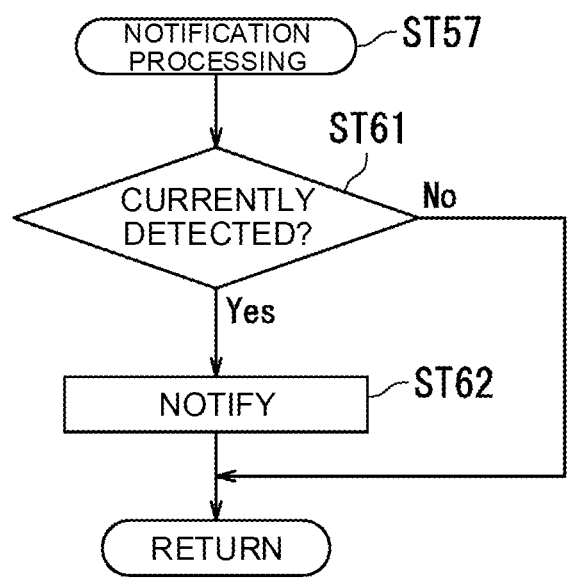
FIG. 11 is a flowchart illustrating notification processing according to the fourth embodiment of the present disclosure.

Next, a description will be made on processing that is executed by the control section 21 with reference to FIG. 10 and FIG. 11. FIG. 10 is a flowchart illustrating the prohibition/permission processing according to the fourth embodiment. FIG. 11 is a flowchart illustrating notification processing according to the fourth embodiment. The control section 21 of the image forming apparatus 100 according to the fourth embodiment executes the processing, which is illustrated in FIG. 5 and described in the second embodiment.

In the fourth embodiment, the prohibition/permission processing (step ST22) differs from that in the second embodiment and the third embodiment. As illustrated in FIG. 10, the prohibition/permission processing in this embodiment includes step ST51 to step ST58.

In step ST51, the control section 21 prohibits the generation of the sound by the sound generating section 24. Then, the processing proceeds to step ST52.

In step ST52, the control section 21 determines whether the detection section S1 has detected the detection target. If the control section 21 determines that the detection section S1 has detected the detection target (Yes in step ST52), the processing proceeds to step ST53. On the other hand, if the control section 21 determines that the detection section S1 has not detected the detection target (No in step ST52), the processing proceeds to step ST54.

In step ST53, the control section 21 permits the generation of the sound by the sound generating section 24. Then, the processing proceeds to step ST55.

In step ST54, the control section 21 determines whether the remote connection has been canceled. If the control section 21 determines that the remote connection has been canceled (Yes in step ST54), the prohibition/permission processing is terminated. On the other hand, if the control section 21 determines that the remote connection has not been canceled (No in step ST54), the processing proceeds to step ST52.

In step ST55, the control section 21 executes the same processing as that in step ST45 described with reference to FIG. 7 and FIG. 8. More specifically, the control section 21 transmits the information indicating that the detection section S1 has detected the detection target to the external terminal Z via the communication section 23. In this embodiment, the control section 21 transmits the message M1 to the external terminal Z. As a result, as it has been described with reference to FIG. 8, the message M1 appears on the display Z1 of the external terminal Z. Then, the processing proceeds to step ST56.

In step ST56, the control section 21 determines whether the remote connection has been canceled. If the control section 21 determines that the remote connection has been canceled (Yes in step ST56), the processing proceeds to step ST57. On the other hand, if the control section 21 determines that the remote connection has not been canceled (No in step ST56), the processing proceeds to step ST58.

In step ST57, the control section 21 executes the notification processing. As a result, the prohibition/permission processing is terminated. A description on the notification processing will be made below with reference to FIG. 11.

In step ST58, the control section 21 determines whether the detection section S1 currently detects the detection target. If the control section 21 determines that the detection section S1 currently detects the detection target (Yes in step ST58), the processing proceeds to step ST56. On the other hand, if the control section 21 determines that the detection section S1 does not currently detect the detection target (No in step ST58), the processing proceeds to step ST51.

Next, a description will be made on the notification processing (step ST57) according to this embodiment with reference to FIG. 11. As illustrated in FIG. 11, the notification processing according to this embodiment includes step ST61 and step ST62.

In step ST61, the control section 21 determines whether the detection section S1 currently detects the detection target. If the control section 21 determines that the detection section S1 currently detects the detection target (Yes in step ST61), the processing proceeds to step ST62. On the other hand, if the control section 21 determines that the detection section S1 does not currently detect the detection target (No in step ST61), the notification processing is terminated.

In step ST62, the control section 21 controls the notification section S2 to output the sheet P, on which the message image is formed. More specifically, the image forming section 14 forms the message image on the sheet P, and the discharge section 16 discharges the sheet P, on which the message image is formed, to the outside of the casing 10. As a result, the notification processing is terminated. That is, in this embodiment, the processing to output the sheet P, on which the message image is formed, corresponds to the processing to notify the user of the image forming apparatus 100 that the operation of the operation section 4 by the external terminal Z is finished.

Figure 12:
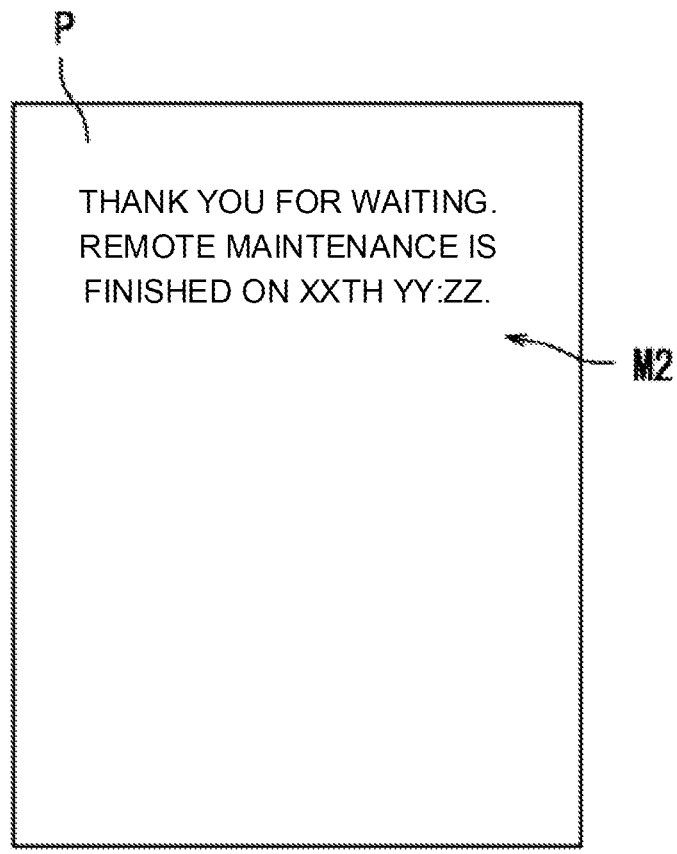
FIG. 12 is a view illustrating a message image printed on a sheet according to the fourth embodiment of the present disclosure.

A description will be made on a message image M2 indicating that the operation of the operation section 4 by the external terminal Z is finished with reference to FIG. 12. FIG. 12 is a view illustrating the message image M2 that is printed on the sheet P. When the operation by the external terminal Z is finished while the detection section S1 detects the detection target, the control section 21 controls the image forming section 14, the fixing section 15, and the discharge section 16 to discharge the sheet P, on which the message image M2 is formed, to the outside of the casing 10. For example, the message image M2 that "THANK YOU FOR WAITING. REMOTE MAINTENANCE IS FINISHED ON THE XXTH AT YY:ZZ." is printed on the sheet P.

The fourth embodiment has been described so far with reference to FIG. 1, FIG. 5, and FIG. 9 to FIG. 12. In this embodiment, the image forming section 14, the fixing section 15, and the discharge section 16 are controlled to discharge the sheet P, on which the message image M2 is formed, to the outside of the casing 10. As a result, the image forming apparatus 100 can notify the user near the image forming apparatus 100 that the direct operation of the image forming apparatus 100 becomes available while the image forming apparatus 100 does not generate the sound.

The description has been made so far on the embodiments of the present disclosure with reference to the drawings. However, the present disclosure is not limited to the above embodiments, and can be implemented in various aspects within the scope that does not depart from the gist thereof. Some components may be deleted from all the components described in the embodiments The drawings schematically and primarily illustrate each of the components to promote understanding. A thickness, a length, the number, an interval, and the like of each of the illustrated components differ from the actual thickness, the actual length, the actual number, the actual interval, and the like for convenience of creation of the drawings. A material, a shape, a dimension, and the like of each of the components illustrated in the above embodiments are merely one example and are not particularly limited. Various modifications can be made thereto within the scope that does not substantially depart from the configuration of the present disclosure.

For example, as it has been described with reference to FIG. 1, the image forming apparatus 100 is the monochrome multifunction peripheral in the embodiment according to the present disclosure. However, the present disclosure is not limited thereto. For example, the image forming apparatus 100 is may be a color multifunction peripheral, an ink jet printer, or a facsimile machine (FAX).

In addition, as it has been described with reference to FIG. 2, in the embodiment according to the present disclosure, the external terminal Z is communicably connected to the image forming apparatus 100 via the intranet. However, the external terminal Z can communicably be connected to the image forming apparatus 100 via any of various communication networks such as the Internet, a mobile phone communication network, and a public telephone communication network. Furthermore, in the embodiment according to the present disclosure, the description has been made on the processing in which the external terminal Z maintains and changes the settings of the image forming apparatus 100. However, the processing targets by the external terminal Z are not limited to the maintenance and the setting change.

Moreover, as it has been described with reference to FIG. 1, FIG. 5, and FIG. 9 to FIG. 12, in the embodiment according to the present disclosure, the method for notifying the termination of the remote operation by the external terminal Z is printing. However, in the case where the image forming apparatus 100 is provided with a light-emitting diode (LED), the LED may be turned on.

The present disclosure can be used in the field of the image forming apparatus.

What is claimed is:

1. An image forming apparatus comprising:
    a communication section that is communicably connected to an external terminal;
    an operation section that is operated by the external terminal;
    a sound generating section that generates sound when the operation section is operated; and
    a control section that controls the sound generating section, wherein
    the operation section has an operation accepting section that accepts an operation by an operator, and
    the control section:
        determines whether the operation section is operated by the external terminal or operated by the operator when the operation section is operated;
        prohibits generation of the sound by the sound generating section in the case where it is determined that the operation section is operated by the external terminal; and
        permits the generation of the sound by the sound generating section in the case where it is determined that the operation section is operated by the operator, and
    wherein the image forming apparatus further comprises a detection section that detects a person who is in a detection range near the image forming apparatus, and
    the control section permits the generation of the sound by the sound generating section when the detection section detects the person while the operation section is operated by the external terminal.

2. The image forming apparatus according to claim 1, the control section sends information indicating that the detection section has detected the person to the external terminal via the communication section when the detection section detects the person while the operation section is operated by the external terminal.

3. The image forming apparatus according to claim 1 further comprising:
    a notification section that notifies termination of the operation of the operation section by the external terminal, wherein
    the control section controls the notification section to notify the termination of the operation of the operation section by the external terminal when the operation by the external terminal is terminated while the detection section detects the person.

4. The image forming apparatus according to claim 3 further comprising:
    an image forming section that forms an image on a recording medium;
    a casing that accommodates the image forming section; and
    a discharge section that discharges the recording medium, on which the image is formed, to outside of the casing, wherein
    the notification section includes the image forming section, and
    the control section controls the image forming section to form a message image on the recording medium when the operation by the external terminal is terminated while the detection section detects the person, the message image indicating that the operation of the operation section by the external terminal is terminated, and
    controls the discharge section to discharge the recording medium, on which the message image has been formed, to the outside of the casing.

5. An image forming system comprising:
    the image forming apparatus according to claim 1; and
    an external terminal that is communicably connected to the image forming apparatus and operates an operation section of the image forming apparatus.

6. An image forming apparatus comprising:
    a communication section that is communicably connected to an external terminal;
    an operation section that is operated by the external terminal;
    a sound generating section that generates sound when the operation section is operated; and
    a control section that controls the sound generating section, wherein
    the operation section has an operation accepting section that accepts an operation by an operator, and
    the control section:
        determines whether the operation section is operated by the external terminal or operated by the operator when the operation section is operated;
        prohibits generation of the sound by the sound generating section in the case where it is determined that the operation section is operated by the external terminal; and
        permits the generation of the sound by the sound generating section in the case where it is determined that the operation section is operated by the operator,
    wherein the image forming apparatus further comprising:
    a detection section that detects a detection target;
    a notification section that notifies termination of the operation of the operation section by the external terminal;
    an image forming section that forms an image on a recording medium;
    a casing that accommodates the image forming section; and
    a discharge section that discharges the recording medium, on which the image is formed, to outside of the casing,
    wherein the control section controls the notification section to notify the termination of the operation of the operation section by the external terminal when the operation by the external terminal is terminated while the detection section detects the detection target, and wherein the notification section includes the image forming section, and
the control section controls the image forming section to form a message image on the recording medium when the operation by the external terminal is terminated while the detection section detects the detection target, the message image indicating that the operation of the operation section by the external terminal is terminated, and
controls the discharge section to discharge the recording medium, on which the message image has been formed, to the outside of the casing.

\* \* \* \* \*